United States Patent [19]

McConnell, III et al.

[11] Patent Number: 4,762,228
[45] Date of Patent: Aug. 9, 1988

[54] VIDEO TAPE REEL BOX WITH SELF OPENING TOP

[75] Inventors: Joseph W. McConnell, III, Federal Way; Richard D. Wilburn, Jr., Mercer Island; Allan R. Northrup, Bellevue; Lloyd D. Neal, Woodinville, all of Wash.

[73] Assignee: Amaray International Corporation, Redmond, Wash.

[21] Appl. No.: 13,005

[22] Filed: Feb. 10, 1987

Related U.S. Application Data

[63] Continuation-in-part of Ser. No. 828,805, Feb. 10, 1986.

[51] Int. Cl.4 ............................................ B65D 85/672
[52] U.S. Cl. .................................... 206/387; 206/397; 206/408; 220/343; 220/326
[58] Field of Search ....................... 206/387, 397, 408; 220/343, 315, 326, 324

[56] References Cited

U.S. PATENT DOCUMENTS

| | | |
|---|---|---|
| 2,558,839 | 7/1951 | Goldberg . |
| 3,169,682 | 2/1965 | Hollingsworth . |
| 3,417,894 | 12/1968 | Gittler . |
| 3,441,071 | 4/1969 | Schurman et al. . |
| 3,441,128 | 4/1969 | Goldberg . |
| 3,454,153 | 7/1969 | Jensen . |
| 3,552,551 | 1/1971 | Goldberg et al. . |
| 3,612,233 | 10/1971 | Nagpal et al. . |
| 4,083,449 | 4/1978 | Rubins . |
| 4,407,412 | 10/1983 | Thiele et al. . |

*Primary Examiner*—Joseph Man-Fu Moy
*Attorney, Agent, or Firm*—Seed & Berry

[57] ABSTRACT

A storage and transport box for one inch video tape reels and the like. The box has a base forming a reel receptacle and a pivotally attached top for closing the receptacle. An elongated latch door secured the top to the base in the closed position. Tabs on the elongated latch door assist the user in opening the top with respect to the base when the top is resiliently biased in the closed position by detents in the base.

9 Claims, 5 Drawing Sheets

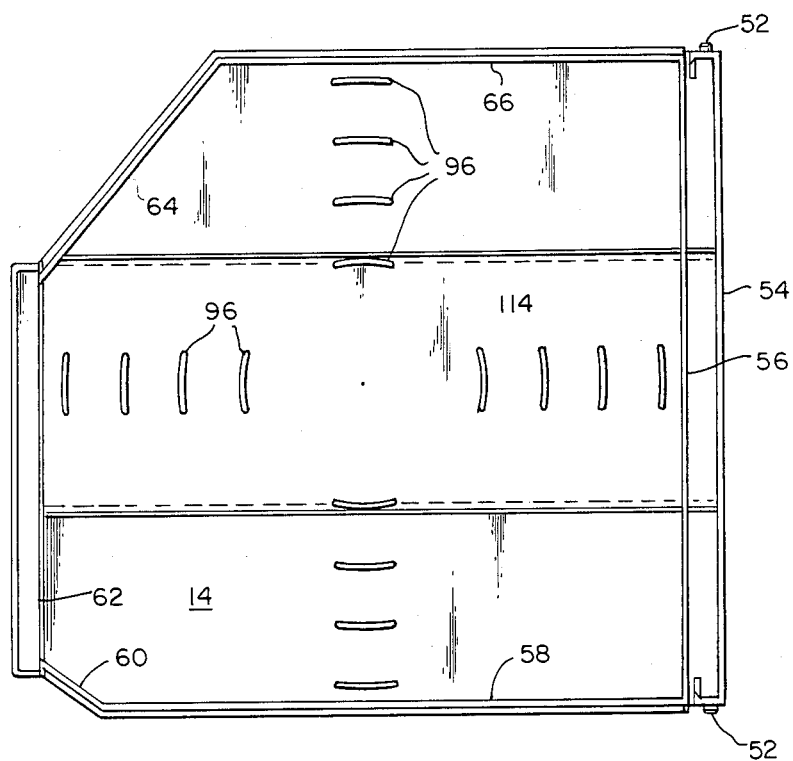
FIG. 3
FIG. 4
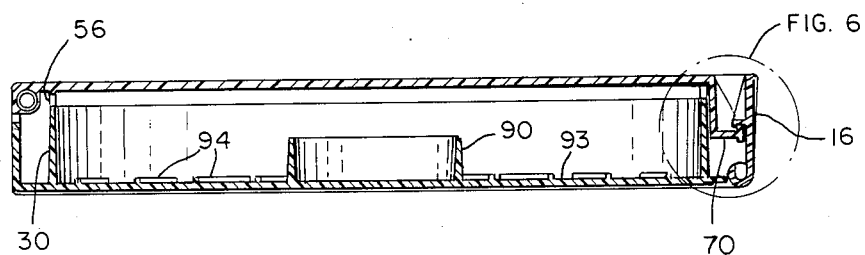

VIDEO TAPE REEL BOX WITH SELF OPENING TOP

CROSS-REFERENCE TO RELATED APPLICATIONS

This application is a continuation-in-part of co-pending application Ser. No. 828,805 filed Feb. 10, 1986 titled VIDEO TAPE REEL BOX.

TECHNICAL FIELD

The invention relates to storage and transit boxes for reels. Specifically, the invention relates to a storage box for commercial video tape reels.

BACKGROUND OF THE ART

Various devices have been designed for the storage and transportation of film reels and reels of magnetic tape. Early devices for the transport of film reels such as the film reel carrying case disclosed by Goldberg in U.S. Pat. No. 2,558,839 allow the multiple stacking of film reels side-by-side in a carrying case. Modern attempts at providing transport cases for magnetic computer or video tape are disclosed in U.S. Pat. Nos. 3,454,153 to Jensen; 3,417,894 to Gittler; 3,169,682 to Hollingsworth; and 4,407,412 to Thiele et al. Typically, these cases are made from molded plastics and are primarily designed for transporting magnetic tape.

None of the described carrying cases, however, are ideally suited to provide safe transit for one inch magnetic video tape reels and library storage for such reels in a single device. For example, in a typical reel container disclosed by Rubins in U.S. Pat. No. 4,083,499 a central locking knob is selectively rotatable to three different positions to lock the reel within the box. A similar central locking knob is disclosed by Jensen. While this type of locking device is suitable for transit of video tape reels, it is inconvenient for ordinary every day use where the reel container is stored on a bookshelf in a commercial video tape library. Alternate methods for closing the reel case as disclosed by Hollingsworth and Gittler require complete separation of the upper and lower halves to access the stored reel. This method, while suitable for reels in transport is more burdensome than the central locking knob for routinely accessing reels contained in the case in a library.

Thus, a need exists for a video tape storage box which has the high security features of the previously discussed devices while providing quick access to stored reels to facilitate access to the reels in a commercial video tape library.

DISCLOSURE OF THE INVENTION

Therefore, it is an object of the invention to provide a video tape storage box having a convenient latch.

It is also an object of the present invention to provide a video tape storage box which is well adapted for use in a commercial video tape library.

These objects and other advantages of the invention which will become apparent from the description which follows, are achieved by providing a video tape storage box having an elongated latch and specially formed hinges which provide a secure and convenient storage box for magnetic video tape reels.

The video tape reel storage box has a base with upwardly depending walls forming a reel receptable. The base has a raised central hub for locating the reel by receiving the central opening of the reel on the hub. Raised concentric rings hold the reel slightly above the base to facilitate removal of the reel from the box.

A top is pivotally attached to the base by a hinge. The top is pivotable between an open and closed position. The hinge is specially formed with an interior wall at the rear of the top section to prevent the introduction of dust into the box. The top section also has an exterior wall to support the hinge and to protect the hinge from bumps and other impacts during transit.

An elongated latch door is pivotally connected to the base and has means for securing the top to the base in the closed position. Pivots between the latch door and base, and base and top are specially formed to impart extra strength to the pivoting members. Both the top and the base have pins which are recieved by corresponding pin receptacles in the base and latch door respectively. The pins are seated in the pin receptacles while the base is still hot from the forming process. Upon cooling, a greater force is required to unseat the pins than was required to seat the pins, resulting in a secure pivot between the base and top and base and latch door.

The latch door has an inward extension which engages an outwardly depending lip on the top to lock the lid in the closed position. The lip has an upwardly extending rim which interacts with the inward extension on the latch door to form a detent position so that latch door can be quickly disengaged from the top to allow quick access to the reel stored in the box. The latch door is elongated so that a relatively long latch surface exists between the top and the latch door. Thus, while the latch door is easily disengaged from the top, it is very secure when in the closed and locked position. In a preferred, alternate embodiment of the invention tabs or other means are provided on the latch door for "kicking open" the top from the bottom when the latch door is moved between the open and closed positions.

The outer walls of the base are provided with feet to allow the box to stand vertically like a book in a commercial video tape library. The outer sides of the base walls also have depressions for the affixation of identifying labels thereto. The outside of the latch door is also provided with a similar depression.

The box also has a carrying handle located on the outside of one of the base walls. The base wall having the handle is mounted opposite to the side of the box having the pivot between the top and base and is disposed at an angle thereto. Therefore, when a reel is carried within the box by the handle, the axis of the top pivot is at an angle with respect to the vertical. The torsional rigidity of the base can be selected so that the base tends to misalign with the top when a reel is carried in the box by the handle, causing the top to further lock in its closed position. The weight of the reel is primarily carried by a central raised hub within the base.

BRIEF DESCRIPTION OF THE DRAWINGS

FIG. 3 is a plan view of the inside of the top of the box.

FIG. 4 is a section view of the base, top and latch door in the closed position taken along line 4—4 of FIG. 1.

BEST MODE FOR CARRYING OUT THE INVENTION

Figure 1:
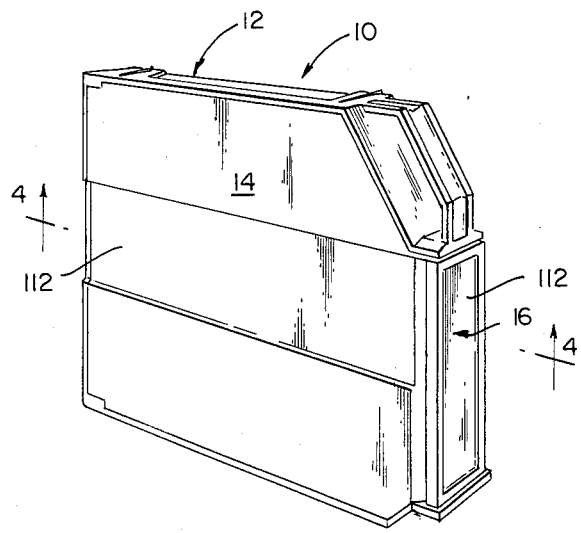
FIG. 1 is an isometric view of a storage and transport box for a video tape reel in accordance with the present invention.

In FIG. 1, a storage box for a video tape reel or other similarly shaped object is generally indicated at reference numeral 10. As shown in the remaining figures, the box has a base 12, a pivotally connected top 14 and a pivotally connected latch door 16. The latch door secures the top to the base in the closed position for transport and storage of a reel contained in the box. The latch door is elongated providing a long contact surface between the latch door and the top which allows quick operation of the latch door without compromising the security of the closure.

Figure 2:
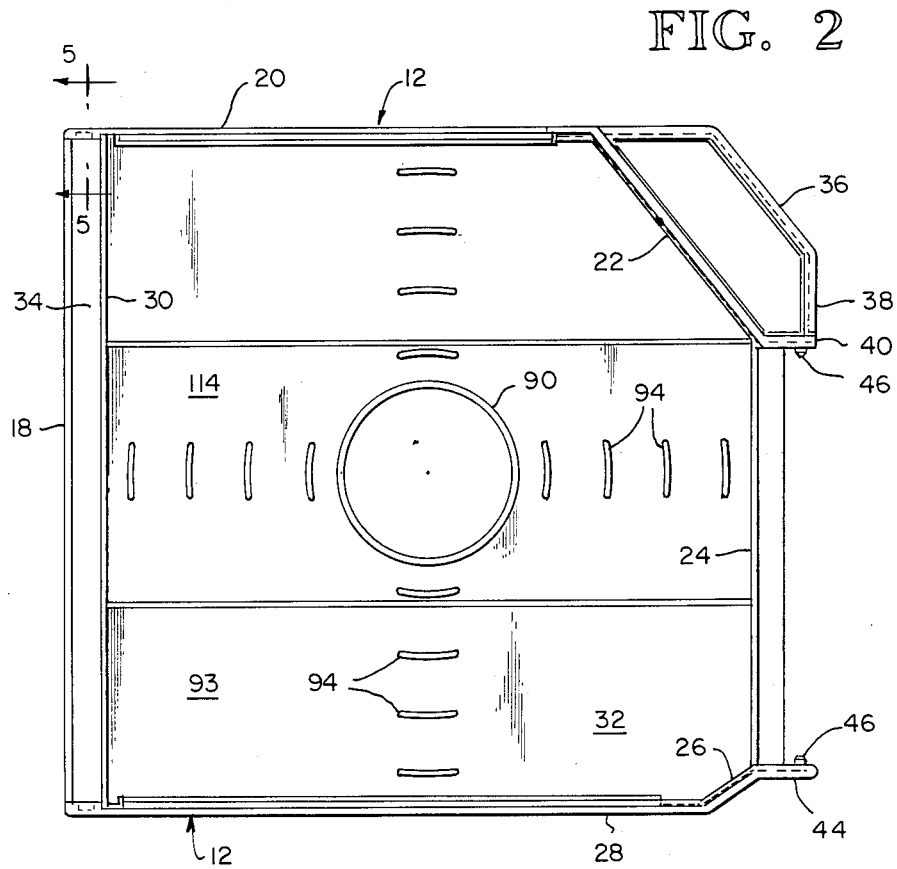
FIG. 2 is a plan view of the inside of the base of the box.

As best shown in FIG. 2, the base 12 is provided with 6 external walls 18, 20, 22, 24, 26 and 28. An internal wall 30 divides the base into a reel receptacle, generally indicated at reference numeral 32 and a hinge receptacle, generally indicated at reference 34. Two of the external walls, 22 and 26, are disposed at an obtuse angle from the other external walls 20, 24 and 28 and are therefore disposed from the hinge receptacle 34 at the complementary angle. One of the external walls 22 supports a handle 36 which is connected to the outside of the external wall 22. One end 38 of the handle is connected to a latch mount 40 which extends from one end of the external wall 24. A second latch mount 44 extends from the other end of the external wall 24. The latch mounts 40 and 44 support inwardly projecting latch pivot pins 46 for the attachement of the latch door 16.

Figure 5:
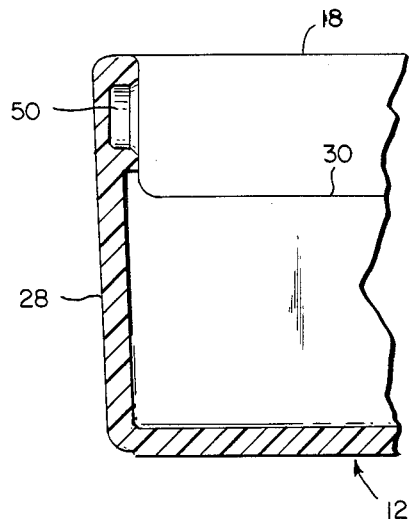
FIG. 5 is an enlarged sectional view of the base taken along line 5—5 of FIG. 2.

As best seen in FIG. 5, the hinge receptacle 34 has pin receptacles 50 in external walls 20 and 28. The pin receptacles provide seats for corresponding pins to pivotally attach the top 14 to the base 12. The top pivot pins 52 are best seen in FIG. 3. The pivot pines 52 are mounted on a top hinge section 54 which is sized to rotate within the hinge receptacle 34 of the base. The top 14 has an internal wall 56 which rests upon and aligns with the base internal wall 30 as shown in FIG. 4 when the top is in a closed position. In this way, the hinge components are contained in the hinge receptacle 34 and are sealed from the reel receptacle 32 by internal walls 30 and 56 when the lid is closed to provide a dust barrier between the hinge elements and the reel receptacle. The hinge elements, being contained in the hinge receptacle, are protected from damage during transit.

The top has five downwardly depending flanges 58, 60, 62, 64 and 66 which interact with the external walls of the base when the top is in the closed position. The flanges 58, 60, 64 and 66 are positioned inward of the top perimeter to register with the inside of the base external walls 20, 22, 26 and 28. As shown in FIG. 4, when the lid is closed, the interaction of the top flanges with these external walls forms a dust and weather barrier for the reel receptacle 32.

Figure 6:
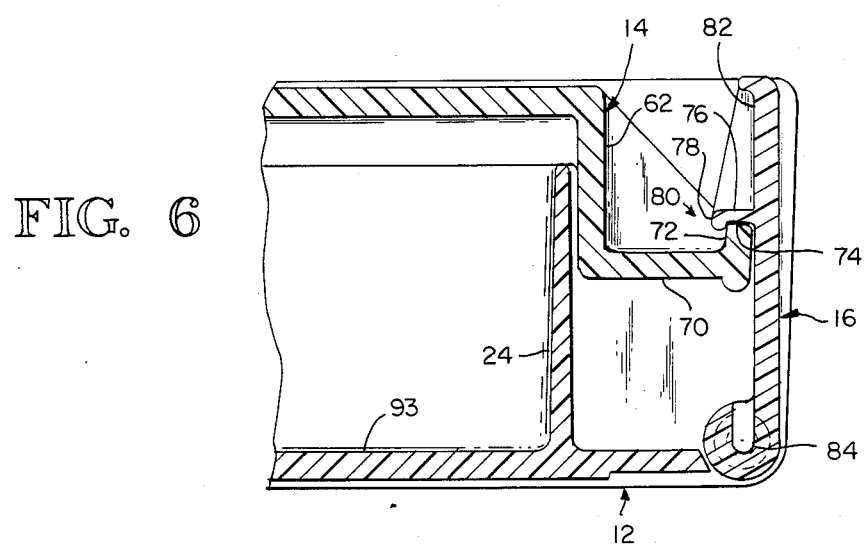
FIG. 6 is an enlarged sectional view of the circled area of FIG. 4.
Figure 7:
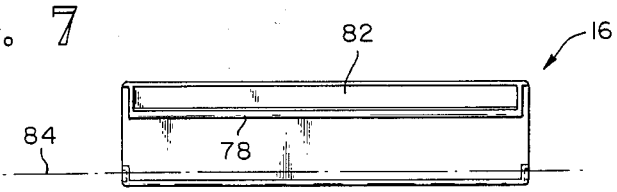
FIG. 7 is a rear elevational view of the inside of the latch door.

The fifth top downwardly depending flange 62 is positioned to closely clear the outside of base external wall 24 when the top 14 is in the closed position. As best shown in FIG. 6, the top flange 62 has an outwardly depending lip 70 which extends away from the base wall 24. The lip 70 has an upwardly extending rim 72 having an upwardly pitched ramp surface 74. The ramp surface is designed to interact with an inward extension 76 of the latch door 16. The inward extension 76 has a skid 78 which rides up the ramp surface and into a detent area 80 to securely hold the latch door in the closed position. The lip 70, rim 72 and inward extension 76 of the latch door extend substantially the entire length of the top flange 62 and external base wall 24. These elements provide a very strong latch to keep the lid in a closed position. However, by grasping the top portion 82 of the latch door 16 the inward extension 76 and skid 78 can be easily disengaged from the detent position so the top can be pivoted to the open position thereby facilitating access to the reel receptacle. The inside of the latch door is shown in FIG. 7.

As shown in FIG. 6, the radial distance between the inward end of the ramp surface 74 and the pivot axis 84 of the latch door 16 is greater than the radial distance between the skid 78 and the pivot axis 84. Therefore, when the latch door is pivoted to the closed position, the skid 78 rises up on the ramp surface 74 bending the inward extension 76 of the latch door radially outward until the detent position is reached. Once in a detent position, the latch door is biased into the closed position and can only be disengaged with a sharp snap of the top portion 82 of the latch door. The construction of the latch between the top and the latch door combines the best features of locking mechanisms intended for transportation boxes and simple closures intended for storage boxes. The latch described is both strong and quick to use. Therefore, the invention is well adapted for use as both a library storage box for video tape reels and a transport box for carrying, et cetera.

A reel to be contained in the box is located within the reel receptacle 32 by a circular, upright wall forming a raised central hub 90 secured to the bottom 93 of the base 12. The bottom 93 of the base 12 also has raised concentric ribs 94 which facilitate lifting a reel from the reel receptacle. The top 14 has similar concentric ribs 96 which, in cooperation with the concentric base ribs 94 hold the reel away from the inner surface of the base and top when in the closed relation. The box is preferably molded from impact polystyrene, such as Mobil 4324 by Mobil Chemical Company, Polystyrene Business Group, of Paramus, N.J., U.S.A., although other materials can be used. The top pivot pins 52 and inwardly projecting latch pivot pins 46 are inserted into corresponding pin receptacles when the external walls 20 and 28 and latch mounts 40 and 44 of the base are still hot after molding. The base walls and latch mounts are splayed apart while still hot then the top 14 and latch door 16 are inserted in place and the base walls are returned to their original position. As the base cools, the walls 20, 28 and latch mounts 40, 44 become increasingly rigid securely holding the pins seated in the corresponding pin receptacles. With this method of construction, a greater force is required to unseat the top from the hinge receptacle and the latch door from the latch mounts than was required to insert these elements in place. The box 10 constructed this way is exceedingly strong at the points of pivotal relation and no tools are required for assembly.

The box 10 is provided with external feet which allow the box to stand in a vertical position. The base and top external walls and the outside of latch door 16 are provided with depressions 112 for affixing identifying labels thereto as would be desired in a commercial video tape library.

The top 14 and base 12 are provided with internal, horizontal stiffening ribs 114, corresponding to depressions 112, to control the torsional stiffness of the base and top. A torsional stiffness for the base can be selected such that the top misaligns with the base when carried by the handle 36. When in the closed position, such racking of the base with respect to the top decreases the possiblity that the box will open even if the latch door is disengaged from the detent position.

Figure 8:
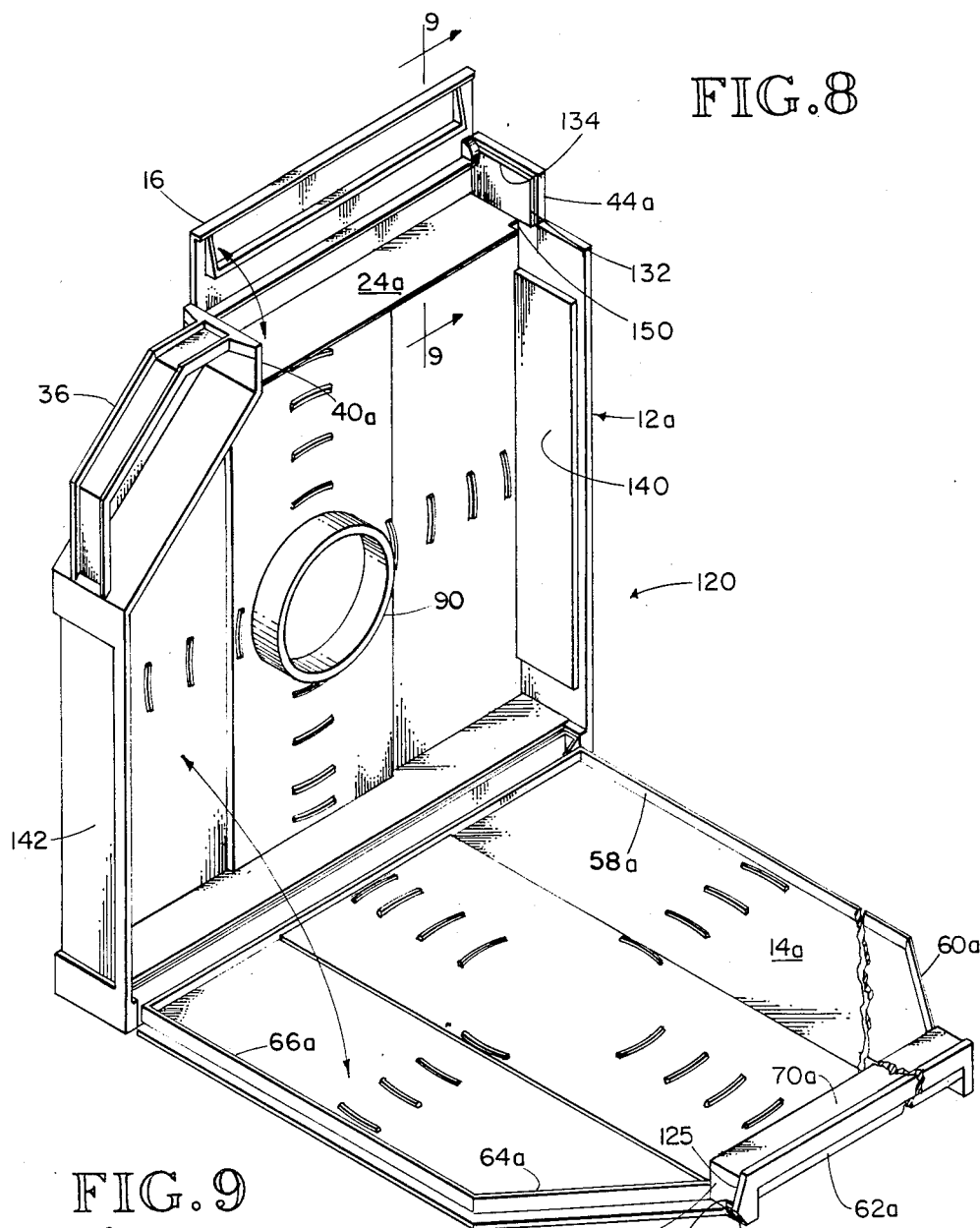
FIG. 8 is an isometric view of an alternate embodiment of the invention.
Figure 9:
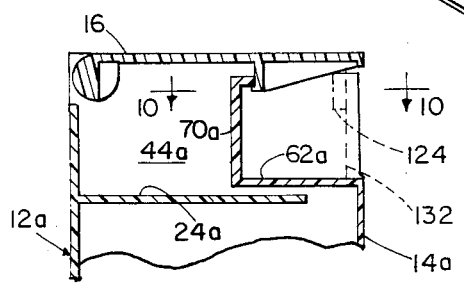
FIG. 9 is a partial sectional view taken along line 9—9 of FIG. 8.
Figure 10:
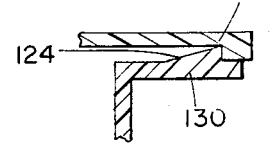
FIG. 10 is a sectional, partial elevational view taken along line 10—10 of FIG. 9.

FIGS. 8 and 9 shown an alternate and preferred embodiment, generally indicated at reference numeral 120, of the storage box 10 shown in FIGS. 1-7.

The storage box 120 has additional ramp-like projections 124 projecting outwardly from square sidewalls 130 of the fifth, top downwardly depending flange 62a. The projections 124 have a first long ramp portion 125 having a small slope and a second short ramp portion 126 having a steep slope. The square sidewalls 130 which support the projections 124 (one on each sidewall) and the latch mounts 40a, 44a deform resiliently until the projections 124 clear lips 132 (one shown on latch mount 44a) which define depressions 134 in the latch mounts 40a and 44a.

As best shown in FIG. 9, the projections 124 reside in the depressions 134 when the lid 14a is in the closed position. In this way, the lid is secured in the closed position even if the latch door 16 is disloged from the position shown in FIG. 9.

In this alternate embodiment, the top downwardly depending flanges 58 and 66a abut the inside surfaces of exterior sidewall panels 140, 142, respectively. The outwardly depending lip 70a of the top 14a abuts the outside surface of the exterior base wall 24a as best shown in FIG. 9. Notches 150 (one shown) in the exterior base wall 24a provide clearance for top downwardly depending flanges 60a and 64a.

Figure 11:
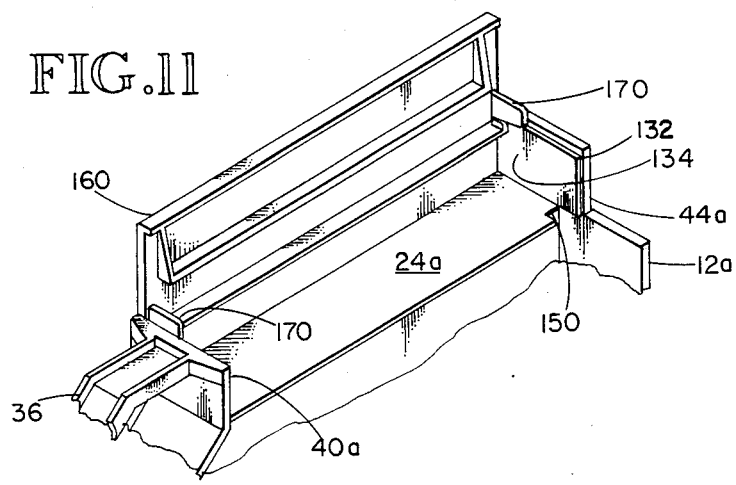
FIG. 11 is a partial, isometric view of the alternate embodiment shown in FIG. 8, utilizing an alternate latch door.
Figure 12:
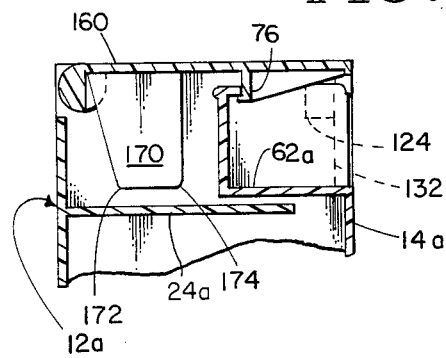
FIG. 12 is a view similar to FIG. 9, of the latch door shown in FIG. 11.
Figure 13:
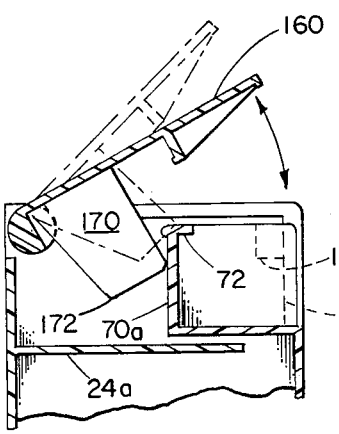
FIG. 13 is a view similar to FIG. 12, showing the alternate latch door moving between an open and closed position.

An alternate latch door 160 for use with the alternate preferred embodiment 12a shown in FIGS. 8-9 is shown in FIG. 11. The alternate latch door has two tabs 170 which extend perpendicularly from the inside surface of the latch door 160. As shown in FIGS. 12 and 13, the tabs 170 serve to disengage the ramp-like projections 124 from the depressions 134. The depressions 134 are defined by the lips 132 on the latch mounts 40a and 44a. It has been found that it may be difficult to disengage the top 14a from the base 12a when the ramps 24 are recieved in the receptacles 134. Thus, the tabs 170 have been provided with rounded edges 172, 174 which are positioned a sufficient distance from the axis of the latch pivot pins 46 to disengage the ramp like projections 124 from the depressions 132. The rounded surface 174 serves to disengage the lid from the base as described when the alternate latch door 160 is moved to the open position while the rounded surface 172 serves to disengage the lid from the base as described when the alternate latch door 160 is moved to the closed position. Thus, the lid can easily be disengaged from the base by moving the alternate latch door from either the open or closed position.

It will be appreciated that other variations and embodiments employing the same general concepts as herein described are contemplated. Therefore, the invention is not to be limited to the above description, but is to be determined in scope by the claims which follow.

We claim:

1. A molded storage box for reel stored media articles, such as a video tape reel, having a central aperture, comprising:
   (a) a molded base having a bottom, a plurality of interconnected, peripheral walls extending upward from the bottom with at least one wall shorter than the others, the short poeripheral wall having external projections defining two ramp receptacles, the bottom and walls defining an enclosed reel receptacle having an open top;
   (b) a top for closing the reel receptacle pivotally connected to the base and having a top wall having a first downwardly depending peripheral flange for closely overlapping the short peripheral wall on the outside thereof, the first flange having an outwardly depending lip with transverse ramp projections to automatically engage the ramp receptacles on the base when the lid is closed, and a plurality of downwardly depending peripheral flanges interconnected with each other and the first downwardlhy depending flange for closely meeting with corresponding peripheral walls of the base to form a lid with enclosed sides mateable with the base to form a fully enclosed box with dust barriers;
   (c) a molded latch pivotally connected to the external projections on the base, the latch being moveable between an open and a closed position including means for engaging the molded latch with the top to secure the top in a closed position; and
   (d) means, molded inside the box, for engaging the central aperture in the article to prevent movement of the article.

2. The box of claim 1 wherein the lip has an upwardly extending rim having an angled ramp surface and wherein the top securing means on the latch comprises an inward extension of the latch having a downwardly depending skid to slide over the angled ramp surface on the lip, wherein the radial distance between the latch pivot axis and the skid is less than the radial distance between the latch pivot axis and at least a portion of the ramp surface when the top is fully closed to resiliently bend the latch extension radially outward as the latch is pivoted to a closed position and to hold the skid behind the ramp after the skid clear the ramp top between an open and closed position.

3. The box of claim 1 wherein the top includes pivot pins connected to the top and wherein the base includes extensions defining pivot pin receptacles, the pins and pin receptacles forming a hinge for pivoting the top between an open and closed position.

4. The box of claim 1 wherein the bottom of the base has a raised central hub sized to receive the inner circumference of a reel to prevent substantial transverse movement of the reel.

5. The box of claim 4 wherein the bottom of the base has raised ribs substantially concentric with the spindle to facilitate lifting the reel from the base.

6. The box of claim 4 wherein the top has raised substantially concentric ribs corresponding to the ribs in the base.

7. The box of claim 1 including depressions on the outside of the external base walls and the latch for receiving labels.

8. The box of claim 1 wherein the base has an external wall having a handle positioned at a substantial angle with respect to the hinge receptacle and wherein the torsional stiffness of the base is insufficient to prevent misalignment of the top with respect to the base so that the lid jams in the closed position when the box is carried by the handle.

9. The box of claim 1 including means, on the molded latch, for disengaging the ramp projections from the ramp receptacles when the latch is moved between the open and closed positions.

* * * * *